Patented Jan. 12, 1937

2,067,511

UNITED STATES PATENT OFFICE 2,067,511

RECOVERY OF VALUABLE PRODUCTS FROM HYDROCARBONS

Georg Stern, Neckargemund, and Werner Hoess, Ludwigshafen-on-the-Rhine, Germany, assignors to I. G. Farbenindustrie Aktiengesellschaft, Frankfort-on-the-Main, Germany No Drawing. Application March 6, 1935, Serial No. 9,614. In Germany March 9, 1934

6 Claims. (Cl. 260—57)

The present invention relates to valuable products from hydrocarbons containing dienes and a process of producing same.

We have found that valuable products can be recovered by subjecting cracking products of hydrocarbons, or other hydrocarbons or hydrocarbon mixtures containing dienes, as for example crude benzine or benzol, to a treatment with paraquinones, in particular alphanaphthoquinone the addition products thus formed being separated.

If the said treatment be effected at low temperatures, it is possible to recover the addition products derived from the para-quinones and cyclic dienes having conjugated double linkages by themselves because any acyclic dienes, as for example isoprene, piperylene and their homologues, present in the cracking products generally speaking first react with the para-quinones at temperatures above 50° C. Furthermore, by reason of the fact that the addition product of methylcyclo-pentadiene is formed more readily than that of cyclopentadiene, it is also possible to recover the said products separately by adding the para-quinones in measured portions and separating the addition products formed. The separation may be effected for example by distillation under reduced pressure, by cooling to low temperatures or by shaking with suitable solvents, such as aqueous alcohol.

It is especially suitable to treat separate fractions of the crude initial materials with the para-quinones.

The addition products themselves are derivatives of anthraquinones and may, for example, serve as initial materials for the preparation of dyestuffs.

By the said treatment, the crude initial materials also undergo an improvement in their stability for storage and become more suitable, for example, for the recovery of any lubricating oils present therein.

The following examples will further illustrate how the said invention may be carried out in practice but the invention is not restricted to these examples. The parts are by weight.

Example 1

55 parts of alpha-naphthoquinone are introduced at ordinary temperature into 1000 parts of a fraction boiling up to about 120° C. of a cracking product of brown coal low temperature carbonization tar. As soon as free alpha-naphthoquinone can no longer be detected, the whole is distilled under reduced pressure. The remaining addition products of the alpha-naphthoquinone with cyclic dienes may be crystallized from methyl alcohol or ligroin.

Example 2

The content of cyclopentadiene and methylcyclopentadiene in a fraction boiling up to about 150° C. of a cracking product of Panhandle oil is determined by adding 1 per cent or less of alpha-naphthoquinone at room temperature while stirring. As soon as the reaction is completed, the whole is distilled, preferably under reduced pressure; 1 per cent of alpha-naphthoquinone is added to the distillate and distillation is again effected when the reaction is completed. The said procedure is completed until no further naphthoquinone is consumed. By determining the crystal form, melting point, mixed melting point or analysis of the crystals in the distillation residues it is possible to ascertain whether the cyclopentadiene addition product or the methylcylopentadiene addition product or a mixture of both is present in the distillation residues; from this the amount of alpha-naphthoquinone to be added may be measured.

On the basis of such an investigation there are added for example to 1000 parts of the said fraction 70 parts of alpha-naphthoquinone while stirring at room temperature, the whole being distilled under reduced pressure, when the reaction is completed. 15 parts of alpha-naphthoquinone are added to the distillate, the whole is distilled in vacuo when reaction is completed and then 25 parts of alpha-naphthoquinone are added to the distillate and the whole distilled again under reduced pressure.

The residue obtained in the first distillation is the addition product of alpha-naphthoquinone and methylcyclopentadiene, that of the second distillation is a mixture of the addition products of alpha-naphthoquinone and methylcyclopentadiene and cyclopentadiene and that of the third distillation is the addition product of naphthoquinone and cyclopentadiene.

Example 3

300 parts of alpha-naphthoquinone are gradually added while stirring at 80° C. to 1000 parts of a cracking product which has been freed from cyclic dienes according to Example 2 the whole being distilled, preferably under reduced pressure, as soon as undissolved alpha-naphthoquinone is no longer present. A mixture of addition products of alpha-naphthoquinone and acyclic dienes remains as the distillation residue.

Example 4

215 parts of alpha-naphthoquinone are gradually added while stirring at ordinary temperature to 2000 parts of the first runnings of crude benzene from gas works. After distillation which is preferably carried out under reduced pressure, there remain 310 parts of the pure addition product formed.

Example 5

1000 parts of a cracking product boiling up to 200° C. and obtained by cracking gaseous hydrocarbons are treated with 375 parts of alpha-naphthoquinone in the manner described in Example 2. After separating the addition products of alpha-naphthoquinone and cyclic diolefines formed, the remaining liquid is heated, preferably in the form of its fractions, at about 100° C., preferably under super-atmospheric pressure with from 2 to 3 per cent of alpha-naphthoquinone. Then the addition product of alpha-naphthoquinone and acyclic dienes is recovered by distilling off the liquid portions under reduced pressure. The said procedure is repeated several times until the formation of addition products has ceased.

What we claim is:

1. A process of recovering valuable products from hydrocarbons containing dienes but of which the major portion consists of compounds other than dienes which comprises subjecting such hydrocarbons containing dienes to a treatment with paraquinones and separating the resulting addition products.

2. A process of recovering valuable products from hydrocarbons containing dienes but of which the major portion consists of compounds other than dienes which comprises subjecting such hydrocarbons containing dienes to a treatment with paraquinones at an elevated temperature and separating the resulting addition products.

3. A process of recovering valuable products from hydrocarbons containing dienes but of which the major portion consists of compounds other than dienes which comprises subjecting such hydrocarbons containing dienes to a treatment with paraquinones under superatmospheric pressure and separating the resulting addition products.

4. A process of recovering valuable products from hydrocarbons containing dienes but of which the major portion consists of compounds other than dienes which comprises subjecting such hydrocarbons containing dienes to a treatment with paraquinones under superatmospheric pressure and an elevated temperature and separating the resulting addition products.

5. A process of recovering valuable products from hydrocarbons containing dienes but of which the major portion consists of compounds other than dienes which comprises subjecting such hydrocarbons containing dienes to a treatment with alpha-naphthoquinone and separating the resulting addition products.

6. A process for the purification of a hydrocarbon mixture containing dienes but of which the major portion consists of compounds other than dienes which comprises treating this mixture with a paraquinone by adding this paraquinone in portions to the said mixture, addition compounds of the said paraquinone with the said dienes thus being formed, and separating from the hydrocarbon mixture the said addition compounds before adding a fresh portion of the said paraquinone.

GEORG STERN.
WERNER HOESS.